United States Patent

Klingauf

Patent Number: 5,913,534
Date of Patent: Jun. 22, 1999

[54] AIRBAG MODULE COVER CAP

[75] Inventor: Gerhard Klingauf, Illerrieden, Germany

[73] Assignee: Takata (Europe) Vehicle Safety Technology GmbH, Ulm, Germany

[21] Appl. No.: 08/886,208

[22] Filed: Jul. 1, 1997

[30] Foreign Application Priority Data

Jul. 1, 1996 [DE] Germany .................. 196 26 416

[51] Int. Cl.$^6$ ................................................ B60R 21/16
[52] U.S. Cl. ................. 280/728.3; 280/731; 280/732
[58] Field of Search .................. 280/728.3, 731, 280/732

[56] References Cited

U.S. PATENT DOCUMENTS

| | | | |
|---|---|---|---|
| 5,069,477 | 12/1991 | Shiraki | 280/732 |
| 5,180,187 | 1/1993 | Müller et al. | 280/732 |
| 5,292,150 | 3/1994 | Watanabe et al. | 280/728.3 |
| 5,458,361 | 10/1995 | Gajewski | 280/728.3 |
| 5,762,362 | 6/1998 | Kikuchi et al. | 280/728.3 |

FOREIGN PATENT DOCUMENTS

| | | |
|---|---|---|
| 0 564 974 | 10/1993 | European Pat. Off. . |
| 2 263 887 | 8/1993 | United Kingdom . |
| 2 265 340 | 9/1993 | United Kingdom . |
| 2 270 884 | 3/1994 | United Kingdom . |

OTHER PUBLICATIONS

Patent Abstracts of Japan, vol. 096, No. 003, Mar. 29, 1996, abstract of Hiroaki, "Structure of Air Bag Part of Instrument Panel", Japanese 07 291078, Nov. 7, 1995.

*Primary Examiner*—Kenneth R. Rice
*Attorney, Agent, or Firm*—Foley & Lardner

[57] ABSTRACT

An airbag module cover cap has two flaps (12, 13) provided in a cover wall (11) which are delimited from the remainder of the cover wall (11) and from the other flap (13, 12) respectively by means of perforations (14) arranged in a line. On triggering of the generator (17) of the airbag module (16), and the tearing of the perforations (14) which is caused thereby, the flaps (12, 13) pivot outwardly about the hinges (15) and thus release the gas bag (18). In accordance with the invention the perforations (14) are provided at the base of continuous grooves (20) provided in the outer surface of the cover wall (11).

28 Claims, 3 Drawing Sheets

AIRBAG MODULE COVER CAP

BACKGROUND OF THE INVENTION

1. Field of the Invention

The invention relates to an airbag module cover cap having perforations that define a flap, such that the perforations tear when the airbag fills allowing the flap to pivot about a hinge formed in the cover material.

2. Description of the Prior Art

In known airbag module cover caps of this kind the tool having the perforating projections necessary to produce the perforation acts on the cover wall from the inside so that the perforations are flush with the outer wall onto which the plastic coating is subsequently applied, which primarily serves decorative purposes.

With this manufacturing process, the pattern of perforations is pressed through up to the outer surface of the plastic coating, which makes it necessary to provide the outer surface of the plastic coating with decorative patterns such that the penetrations of the perforations do not give rise to an unattractive appearance.

SUMMARY OF THE INVENTION

The invention is based on the object of providing an airbag module cover cap of the initially named kind, in which the outer surface of the plastic coating is not impaired by the shape and formation of the perforations.

In order to satisfy this object there is provided an airbag having sidewalls and a cover wall in which there is at least one flap. The flaps are delimited by perforations. The flaps pivot outwardly about a hinge to allow the gas bag to pass outwardly to protect a vehicle occupant. The hinge is formed by a thinning of an area of material of the cover wall. The aforementioned perforations are at the base of continuous grooves which are located at an outer edge of the cover wall and extend parallel to the perforations.

The concept underlying the invention is thus to be seen in the fact that the tool which produces the perforations engages from the outer side of the cover wall, with the perforations arising at a clear spacing from the outer surface of the cover wall at the base of the grooves which are likewise co-formed during manufacture. If the decorative plastic coating, which is preferably of a soft design, is subsequently applied to such a pre-manufactured cover wall, then the perforations lie at a sufficiently clear spacing beneath the outer surface of the plastic coating that a penetration of the perforations to the outer surface is largely precluded. The concept underlying the invention can also be expressed in such a way that the perforations which normally adjoin the outer surface of the cover wall are displaced by the measures of the invention towards the inner surface and are thus placed at a substantially larger spacing from the plastic covering.

BRIEF LISTING OF THE FIGURES

The invention will be described in the following by way of example with reference to the drawing in which are shown:

FIG. 1 a schematic view of an airbag module cover cap in accordance with the invention, seen from the inside looking onto the cover wall, FIG. 1a an enlarged plan-view of one of the perforations, FIG. 1b a view analogous to FIG. 1 of a further embodiment, FIG. 2 a view of the subject of FIG. 1 from the opposite side before the plastic coating has been applied, FIG. 3 a section on the lines III—III in FIG. 1 and in FIG. 2, FIG. 3a a section analogous to FIG. 3 after the application of the plastic coating, FIG. 4 an enlarged section on the line IV—IV in FIGS. 1 and 1b respectively, FIG. 5 a schematic perspective view of a section of a tool which acts, in accordance with the invention, from the outer side of the cover wall, and FIG. 6 an enlarged partial sectional view of an airbag module cover cap in accordance with the invention during the manufacture by means of an external and an internal tool.

DETAILED DESCRIPTION OF PREFERRED EMBODIMENTS

Figure 1:
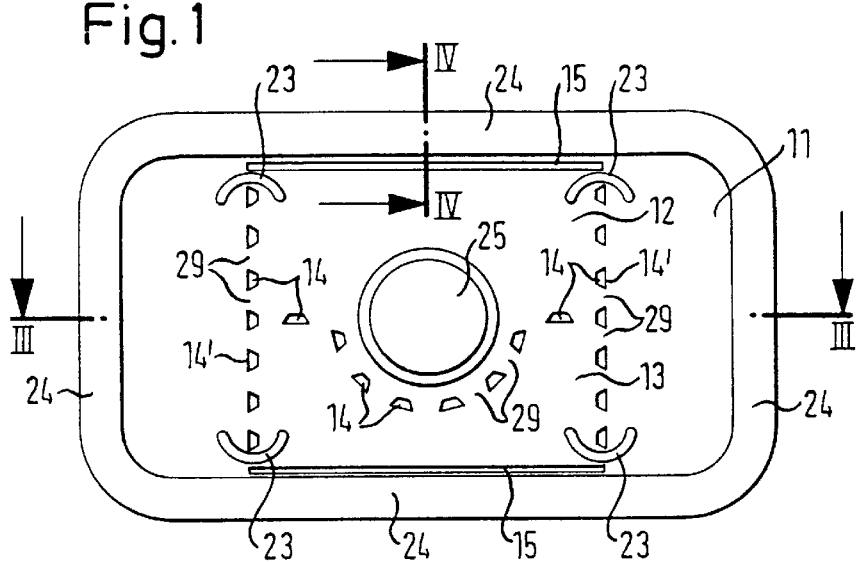
Figure 2:
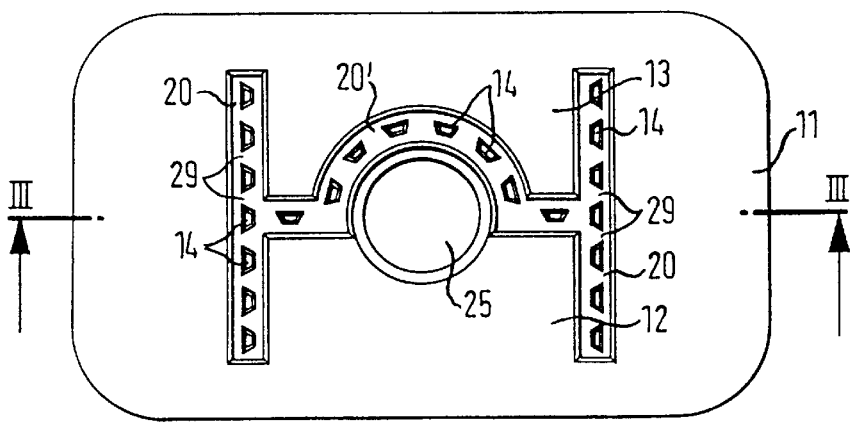
Figure 3:
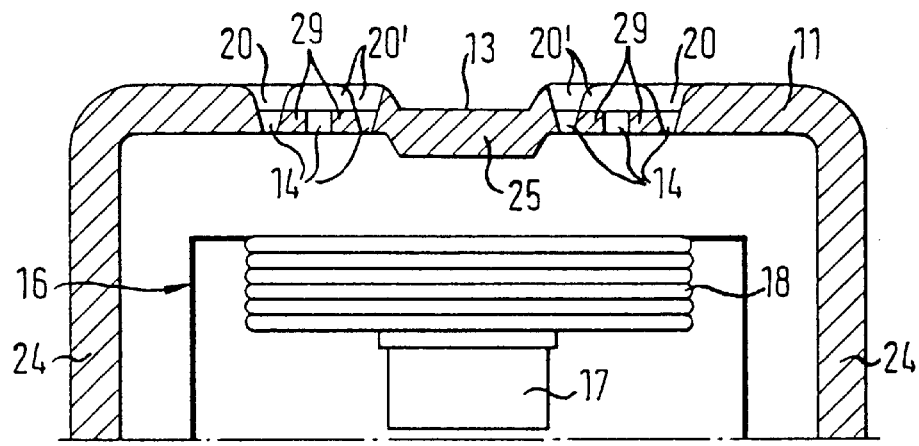

In accordance with the FIGS. 1 to 3 an airbag module cover cap in accordance with the invention has sidewalls 24 which jointly form a peripheral wall and which merge into a substantially rectangular cover wall 11 at the top. The sidewalls 24 and the cover wall 11, which are thus constituted in one piece, form an inverse, pot-like base body of a relatively hard plastic. The longer sides of the cover wall 11 and the sidewalls 24 which adjoin them can also be slightly curved while the two shorter sides and the sidewalls 24 present there do not have to extend parallel to one another but can rather also include a small angle with one another.

Figure 1A:
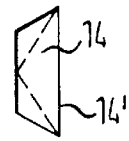
Figure 1B:
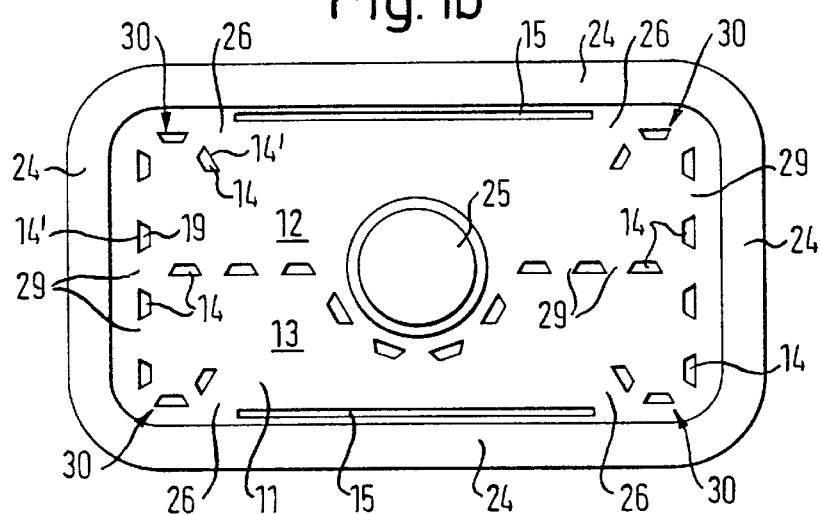
Figure 4:
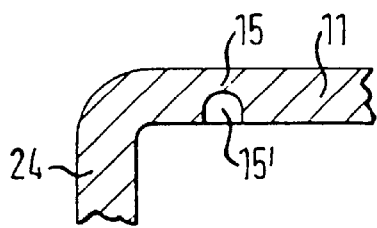

A straight hinge 15 is in each case formed in the cover wall 11 at oppositely disposed marginal regions and parallel to the two longer sides of the cover wall 11 shown in FIGS. 1 and 1b. This is done in such a way that the material is thinned at these positions in accordance with FIG. 4 through the provision of a line-like recess or cutout 15'. The groove-like recess 15' is located at the inner side of the cover wall 11.

As shown in FIG. 2, grooves 20 are moulded into the outer side of the embodiment of the cover wall 11 of FIG. 1 and extend perpendicular to the hinges 15 transversely over the cover wall 11 from positions close to the ends of the hinges 15 at the opposite side of the cover wall 11. A third connection groove 20' extends approximately between the centers of the two lateral grooves 20. It initially has a straight course adjoining the lateral grooves 20 and is then guided essentially in a partial circle around a circular recess 25, which can, for example serve to receive the emblem of a car company.

Perforations 14 which extend up to the inner surface of the cover wall 11 are provided at the base of the grooves 20, 20'. The grooves 20, 20' and the perforations 14 define two flaps 12, 13 within the cover wall 11. On triggering of the generator 17 of an airbag module 16 arranged in the inside of the base body 11, 24, and on the inflation of a gas bag 18 which is caused thereby, the flaps 12, 13 can pivot outwardly about the hinges 15, with tearing of the webs 29 between the perforations 14. Thus the gas bag 18 can emerge out of the opening which is thereby created in the cover wall and can inflate to protect the occupant.

In accordance with FIG. 1a the perforations 14 have a trapezoidal or triangular outline (shown in broken lines) with the longer side 14' or the base side of the triangular outline in each case being located at the outer side of the flaps 12, 13. The spacing of the perforations 14 is such that, on tearing of the webs 29, a straight tear line arises which at least substantially continues along the sides 14' without any sharp projections or irregularities being present at the tear line, which could damage or destroy the inflated airbag 18, which also contacts them there.

In accordance with FIGS. 1 to 3 the grooves 20, 20' have downwardly converging inclined flanks, which are continued into the perforations 14.

In order to avoid the webs 29 which are torn between the perforations 14 from tearing further into the hinges 15 an accumulation of material 23 is provided in accordance with FIG. 1 between the ends of the hinges 15 and the adjoining first perforation 14. This accumulation of material is made so thick and shaped that a tear forming along the propagations 14 is stopped at the accumulations of material 23 and cannot propagate to the ends of the hinges 15.

FIG. 1b shows another advantageous possibility of avoiding a tear which is forming from moving into the hinges 15. The lateral grooves 20 with the perforations 14 are displaced here further outwardly towards the short sides of the cover wall 11. The arrangement of the perforations 14 with the associated lateral grooves 20 is again a straight line over the greater part of the length, similar to the embodiment of FIG. 1. However, at the ends, the grooves 20 and the row of perforations 14 of FIG. 1b have inwardly directed, convex regions of curvature 30, which are formed in detail in such a way that the long sides 14' of one or more of the perforations 14 provided at the end of the groove 20 have a substantial angle of preferably over 30° relative to the longitudinal axis of the hinges 15 and a clear spacing 26 remains between these end perforations 14 and the ends of the hinges 15.

As a result of this measure there is likewise no danger that a tear arising on tearing of the webs 29 would continue into the hinges 15.

Figure 3A:
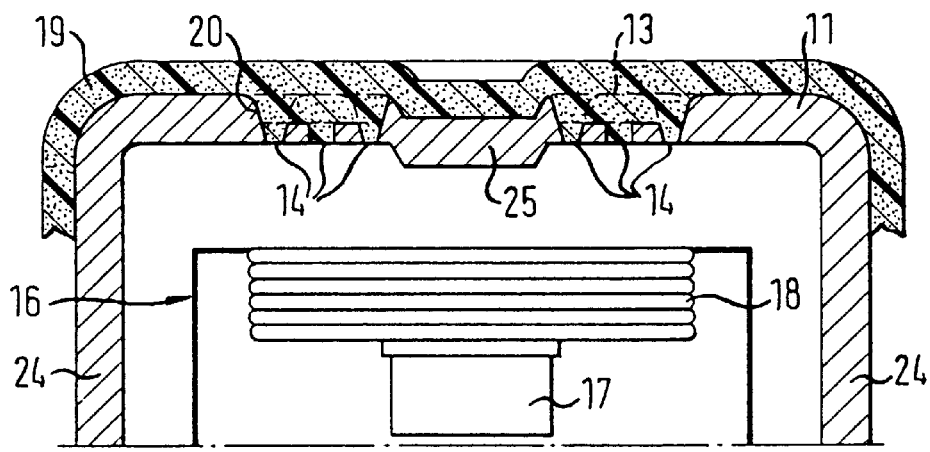

In accordance with FIG. 3a the outer surface of the cover wall 11 is provided with a soft plastic coating, the material of which penetrates into the grooves 20, 20' and the perforations 14 in order to ensure trouble-free anchoring in the cover wall 11.

Figure 5:
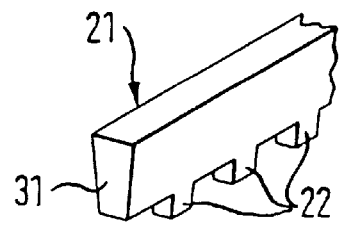
Figure 6:
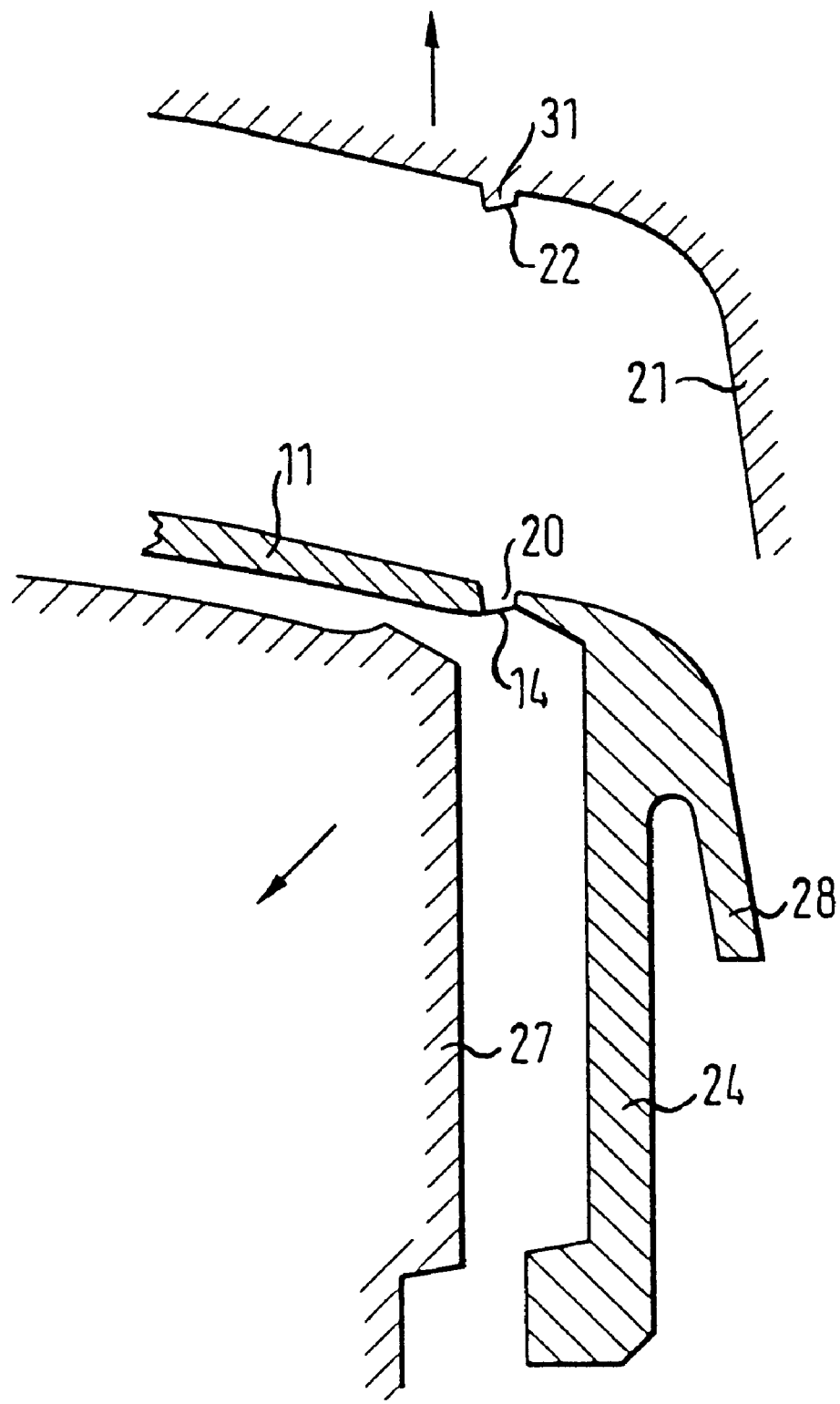

The manufacture of the base body 11, 24 of the cover cap of the invention can, for example, take place by means of an outer tool 21 indicated in FIGS. 5 and 6 which has ribs 31 corresponding to the shape of the grooves 20, 20', with the ribs carrying the perforation projections 22 which are required for the manufacture of the perforations. In accordance with FIG. 6 the outer tool 21 acts from the outer surface of the cover wall 11 while an inner tool 27 provides the inner restraint. In FIG. 6 the two tools 21, 27 are shown in a state in which they are already somewhat removed from the base body 11, 24. The perforations are thus displaced toward the inner side of the cover wall 11 where, as seen in FIG. 3a, they have a considerable spacing from the outer surface of the plastic coating 19 and thus can not penetrate toward the outside. The outer edges of the grooves 2, 20' should be somewhat rounded for the same purpose. In accordance with FIG. 6, obliquely downwardly projecting extensions 28 can also be provided at the sidewalls 24, which can, for example, serve for attachment purposes.

The manufacture and operation of the described airbag module cover cap are as follows:

First of all the two tools 21, 27 are arranged at the required spacing from one another, whereupon plastic is injected to form the base body 11, 24. The two mold halves 21, 27 are subsequently removed from the finished base body 11, 24 in the manner indicated by arrows in FIG. 6. Thereafter the plastic coating 19 of FIG. 3a is then applied by a further but non-illustrated mold.

On triggering of the generator 17 the gas bag 18 inflates and presses from the inside against the flaps 11, 12, whereby the webs 29 between the perforations 14 are torn open and the two flaps can pivot outwardly about the hinges 15. In this way the gas bag 18 can emerge out of the opening which is thereby formed and inflate toward the occupant in the desired manner.

As a result of the design of the invention smooth and non-sharp tear edges arise during the tearing open, whereby no danger exists that the inflating gas bag, which presses against the torn edges, is damaged or destroyed.

The plastic coating 19 may only have a strength and thickness such that it does not hinder the pivoting open of the flaps 12, 13 in the event of triggering of the generator 17.

In the drawing the individual perforations 14 are shown, for the sake of clarity, at a somewhat larger distance from each other than should actually be the case. In other words, the webs 29 between the perforations 14 are to be made so short that a linear, problem-free tearing open of the cover wall 11 takes place along the perforations 14 and the webs 29 in the event of inflation of the gas bag 18.

I claim:

1. Airbag module cover cap having sidewalls and a cover wall in which at least one flap is provided, which is delimited by line-shaped perforations from the remainder of the cover wall or from another flap, and which, on triggering of a generator of the airbag module and the tearing of the perforations which is caused thereby, pivots outwardly about a hinge which is formed by thinning of a material to allow a gas bag of the airbag module to pass through outwardly, with the cover wall and also the sidewalls being provided with a plastic covering serving decorative purposes and having a softer material than the sidewalls and the cover wall, wherein the perforations are located at the base of continuous grooves, which are provided at the outer side of the cover wall and which extend parallel to and in alignment with the perforations and are at least substantially filled out by the material of the plastic covering.

2. Airbag module cover cap in accordance with claim 1, wherein the grooves taper towards the perforations.

3. Airbag module cover cap in accordance with claim 2, wherein an angle of tapering is 5 to 15°.

4. Airbag module cover cap in accordance with claim 1, wherein a depth of the grooves is greater than a depth of the perforations.

5. Airbag module cover cap in accordance with claim 1, wherein a depth of the perforations is 0.4 to 0.8 mm.

6. Airbag module cover cap in accordance with claim 1, wherein a depth of the grooves is 1 to 3 mm.

7. Airbag module cover cap in accordance with claim 1, wherein a depth of the grooves is 2 to 10 times a depth of the perforations.

8. Airbag module cover cap in accordance with claim 1, wherein a width of the grooves is 1 to 2 mm at a top of the grooves.

9. Airbag module cover cap in accordance with claim 1, wherein a hinge is provided at each of two oppositely disposed marginal regions of the cover wall and wherein the two flaps which are formed in this manner are separated by perforations extending between them.

10. Airbag module cover cap in accordance with claim 1, wherein the edges of the grooves are rounded at a transition to an outer surface of the cover wall.

11. Airbag module cover cap in accordance with claim 1, wherein the perforations converge to a point at their ends, lying in or opposite to a direction of tearing.

12. Airbag module cover cap in accordance with claim 11, wherein the perforations are trapezoidal or triangular in shape as seen in plan-view.

13. Airbag module cover cap in accordance with claim 11, wherein a longer boundary side of the perforations lies at a side remote from the flap.

14. Airbag module cover cap in accordance with claim 1, wherein a tear barrier is located between the hinge (15) and the adjoining perforation (14).

15. Airbag module cover cap in accordance with claim 14, wherein the tear barrier includes an accumulation of material provided between the hinge and the neighboring perforation.

16. Airbag module cover cap in accordance with claim 14, wherein the tear barrier includes a spacing between the ends of the hinge and the tear line which extends along the perforation and includes a substantial angle with the hinge.

17. Airbag module cover cap in accordance with claim 1, wherein the material of the plastic coating extends at least fully into the grooves and into the perforation.

18. Method of manufacturing an airbag module cover cap in accordance with claim 1, wherein the grooves and the perforations are formed by an outer tool which acts on an outer surface of the cover wall and carries the perforation projections and by an inner tool which is held from an inside.

19. Method in accordance with claim 18, wherein the plastic coating is applied to the so prepared cover wall and the sidewalls and in the perforations.

20. Airbag module cover cap in accordance with claim 12, wherein the longer boundary side of the perforations lies at the side remote from the flap, i.e. outwardly in relation to the flap.

21. Airbag module in accordance with claim 2, wherein the taper continues into the perforations.

22. Airbag module cover cap in accordance with claim 3, wherein the angle of tapering is approximately 10°.

23. Airbag module cover cap in accordance with claim 5, wherein the depth of the perforations is approximately 0.6 mm.

24. Airbag module cover cap in accordance with claim 6, wherein the depth of the grooves is approximately 2 mm.

25. Airbag module cover cap in accordance with claim 7, wherein the depth of the grooves is approximately 5 times the depth of the perforations.

26. Air module cover cap in accordance with claim 8, wherein the width of the grooves is approximately 1.5 mm at the top.

27. Air module cover cap in accordance with claim 9, wherein the hinge is at a top of the cover wall.

28. Airbag module cover cap in accordance with claim 9, wherein the hinge is at a bottom of the cover wall.

* * * * *